United States Patent
Woodhall et al.

[11] Patent Number: 5,876,791
[45] Date of Patent: Mar. 2, 1999

[54] PROTECTIVE COATING COMPOSITIONS AND METHODS OF USE THEREOF

[75] Inventors: Edward W. Woodhall, Los Altos; Ronald Swidler, Palo Alto, both of Calif.

[73] Assignee: Cal-West Equipment Co., Inc., Sunnyvale, Calif.

[21] Appl. No.: 382,359

[22] Filed: Feb. 1, 1995

[51] Int. Cl.$^6$ ................................ B05D 3/12; C09K 3/00
[52] U.S. Cl. .................. 427/156; 427/154; 427/282; 427/384; 427/385.5; 106/2; 106/162; 106/215; 524/379; 524/557
[58] Field of Search ................. 427/154, 155, 427/156, 282, 385.8, 384; 106/2, 215, 162; 524/379, 557

[56] References Cited

U.S. PATENT DOCUMENTS

| | | |
|---|---|---|
| 1,551,495 | 8/1925 | Lionne . |
| 2,031,673 | 2/1936 | Schneider et al. . |
| 3,034,915 | 5/1962 | Kornbluth . |
| 3,455,712 | 7/1969 | Webb ............... 106/157 |
| 3,476,575 | 11/1969 | Arnold .............. 106/2 |
| 3,819,394 | 6/1974 | Schnebel, Jr. et al. . |
| 3,839,066 | 10/1974 | Brenner . |
| 3,853,576 | 12/1974 | Netznik . |
| 4,009,076 | 2/1977 | Green et al. . |
| 4,253,999 | 3/1981 | Okishi .............. 106/2 |
| 4,325,745 | 4/1982 | Milevski ............ 134/4 |
| 4,632,848 | 12/1986 | Gosset et al. ........ 427/154 |
| 5,028,350 | 7/1991 | Marsek .............. 252/88 |
| 5,143,949 | 9/1992 | Grogan et al. ....... 523/334 |
| 5,201,946 | 4/1993 | Marsek .............. 106/208 |
| 5,302,413 | 4/1994 | Woodhall et al. ..... 427/54 |
| 5,308,647 | 5/1994 | Lappi ............... 427/154 |
| 5,330,564 | 7/1994 | Geke et al. ......... 106/2 |
| 5,418,006 | 5/1995 | Roth et al. ......... 427/154 |
| 5,429,839 | 7/1995 | Graiver et al. ...... 427/15 |

FOREIGN PATENT DOCUMENTS

| | | |
|---|---|---|
| 2391784 | 1/1979 | France . |
| 249930 | 9/1925 | United Kingdom . |
| 344453 | 12/1929 | United Kingdom . |
| 707488 | 4/1954 | United Kingdom . |

*Primary Examiner*—Janyce Bell
*Attorney, Agent, or Firm*—Townsend and Townsend and Crew

[57] ABSTRACT

A vehicle masking material and method of use. The masking material in one embodiment includes a dextrin, a plasticizer, and water. The masking material may additionally include a surfactant. The masking material is applied to a surface which is to be protected from paint overspray or other coating processes, allowed to dry, and the surface is coated (e.g. with paint). After drying of the paint, or other coating, the masking material is removed by water washing.

20 Claims, No Drawings

PROTECTIVE COATING COMPOSITIONS AND METHODS OF USE THEREOF

BACKGROUND OF THE INVENTION

The present invention relates to the field of protective coatings to be used during coating operations of various surfaces including surfaces of vehicles or buildings. More specifically, in one embodiment the invention provides an improved method and composition for masking selected portions of a surface, in particular a vehicle surface, from paint.

It is well known that painting operations often require masking of certain portions of the surface of the painted object to prevent overspray. For example, it is often necessary to mask trim and windows on a vehicle from paint overspray. Also, building stucco must frequently be protected from paint or primer coats. On occasion, it is necessary to mask painted portions of a vehicle or building from paints of a different color and overspray of paints of the same color.

In practice, masking operations are often one of the most time consuming and, therefore, expensive parts of the painting process. In spite of attempts to develop suitable chemical masks for vehicle painting, vehicle painters continue to use primarily masking tape and paper to cover portions of a vehicle where paint is not desired. To mask the trim on a car, for example, will often require many hours of tedious labor. Furthermore, even when done carefully, defects in such paint masks allow paint to contact surfaces which are desired to be protected.

Chemical masking solutions have been proposed to the problem of protecting surfaces during coating processing operations. However, such techniques have often not found extensive use. Some of the proposed chemical masks have been unsuitable for application to portions of a vehicle or building because of damage which would potentially occur to the protected portions of the vehicle or building. Other compositions are not water soluble which increases the difficulty and expense of removal. In addition, masks that require solvents for removal are problematic in view of the increasing regulation of disposal of solvents as environmental regulation becomes stricter with time. Other compositions are difficult to apply, difficult to remove, excessively costly, or the like.

From the above it is seen that an improved masking that is easily applied and removed, that provides good surface protection, that is economical, and whose use entails little or no environmental impact is needed.

SUMMARY OF THE INVENTION

An improved masking composition and method is provided by virtue of the present invention. The method includes the steps of applying a substantially continuous film of a masking material on a vehicle, building, or other surface to be protected during a "coating operation" such as painting. The vehicle, building, or other surface may then be coated with a "coating compound" such as paint or any other compound which is to be applied to the surface. Finally, the masking material may be removed from the surface by washing with water thereby removing any coating compound that may be present on the masking material. These steps may be performed, for example, during an assembly line production of a vehicle or other article of manufacture.

By "coating compound" it is desired to include any compound which is applied to a surface. Coating compounds include materials such as paint or other finishing materials such as lacquer, varnish, waxes and the like which adhere to the surface to which they are applied thereby forming a relatively permanent finish. Coating compounds, however, may also include compounds designed for temporary application to surfaces as in surface preparative treatments such as acids, oils, and antioxidants from which it may be necessary or desired to shield other surfaces.

By "building" it is intended to mean herein a house, warehouse, apartment, garage, store, or the like. By "vehicle" it is intended to mean herein a car, boat, plane, train, railroad car, or the like. By "substantially continuous film" it is intended to mean herein a film lacking pinholes through which paint or other materials generated during a coating operation processing could reach an underlying surface.

The masking material is, in one embodiment, a composition comprising dextrin and plasticizer. The masking materials preferably contain a high concentration of solids. In a particularly preferred embodiment, the dextrin may comprise from about 5 percent to about 60 percent, more preferably from about 20 percent to about 60 percent and most preferably about 30 percent to about 50 percent, by weight, of the composition. A particularly preferred embodiment comprises about 30 to about 40 percent, by weight dextrin.

The plasticizer is preferably present in an amount ranging from about 2 percent to about 30 percent, more preferably from about 5 percent to about 30 percent, and most preferably from about 18 to about 30 percent by weight of the dextrin. This represents an amount ranging from about 0.8 percent to about 12 percent, more preferably from about 2 percent to about 12 percent and most preferably from about 7 percent to about 12 percent, by weight, of the total masking composition.

The masking material may additionally include a surfactant. The surfactant may comprise up to about 0.02 weight percent fluorinated surfactant. The surfactant, when present, ranges up to about 5 percent, more preferably up to about 2 percent, and most preferably up to about 1 percent, by weight, of the masking composition. The surfactant may preferably include a foam reduction or foam control agent.

The remainder of the composition is preferably made up of water. Thus, water may range up to about 60 percent, more preferably up to about 50 percent, by weight, of the composition.

One preferred composition comprises about 30 to 40 weight percent dextrin; about 5 to 10 weight percent plasticizer and not over 2 weight percent total surfactant. The surfactant may comprise up to about 0.02 weight percent fluorinated surfactant. Particularly preferred is a composition comprising about 33 weight percent dextrin; about 7 weight percent plasticizer; and about 1.01 weight percent surfactant comprising about 0.01 weight percent fluorinated surfactants. The surfactant may additionally contain a bulk surfactant such as DF-16 or Turkey Red (Acrysol 75). The plasticizer may be urea, or a combination of urea and a plasticizer selected from the group consisting of glycerine, glycerine monostearate and glycerine monooleate. Preferably about 15 to 20 weight percent of the urea may be substituted with glycerine or a glycerine derivative.

In another preferred embodiment, the masking composition includes about 40 percent dextrin, about 8 percent urea, and about 0.2 percent surfactant (e.g. Triton CF-10). The remaining 51.8 percent may be water. The urea in this embodiment may be replaced with about 2 percent, by weight glycerine. Alternatively, the urea may be replaced with a combination of 6 percent of urea and 2 percent glycerine.

In yet another preferred embodiment, the masking composition includes about 40 percent dextrin, about 20 percent urea, and about 0.2 percent surfactant (e.g. Triton X-100). Again, water may make up the remaining 39.8 percent.

Particularly preferred dextrins have a viscosity ranging from about 12 to about 20 seconds, more preferably from about 12 to about 15 seconds, and most preferably about 12 seconds in an aqueous solution comprising 40 percent solids (dextrins), as measured using a number 3 Zahn cup. Particularly preferred surfactants include fluorinated surfactants in combination with "bulk" surfactants such as Turkey Red (Acrysol 75), polyethoxy adducts or modified (poly) ethoxylates such as Triton DF-12, and DF-16.

The masking compositions may additionally be formulated with a combination of dextrin and aliphatic polyols such as polyvinyl alcohol. One preferred embodiment includes about 20 percent dextrin, about 10 percent polyvinyl alcohol (e.g., Elvanol 5105), about 2 percent of a 10% (wt/vol) solution of Triton CF-10, and about 65 percent, by weight, water.

Unless stated otherwise, and of course except when referring to water, all weight percentages herein, refer to the dry weight of the active material. Also, unless otherwise stated, weight percentages are given as weight percentages of the total aqueous composition before drying. Commercial products may contain water addition to the active material. The coatings of this invention are compounded as aqueous solutions. As indicated above, water may therefore comprise up to about 60 percent by weight of the composition before drying.

A further understanding of the nature and advantages of the invention described herein may be realized by reference to the remaining portions of the specification.

DESCRIPTION OF THE PREFERRED EMBODIMENTS

The present invention provides an improved method and composition for protecting a vehicle or other surface subject to a coating operation such as painting. For example, certain regions of an automobile, or other surface, may be masked using the coating composition of the present invention to protect those regions from paint overspray in a painting booth.

The method and composition produces a substantially continuous film which adheres well to a surface to be protected. By "substantially continuous film" it is intended to mean herein a film generally lacking pinholes through which water, oil, paint, dust, or other materials could reach the underlying surface. Further, the material can be removed easily from the surface to be protected after use with a water wash, or by mechanical means such as scraping or peeling, or by combinations of these methods. In addition, because the material is fully biodegradable, it may be simply disposed of (e.g., washed down a sewer) with no substantial environmental impact.

A preferred method of protecting surfaces according to this invention includes steps of applying the coating compositions to the surface to be protected in a substantially continuous film. The compositions are then dried to form a coating that protects the underlying surface from the coating operation (e.g. paint overspray). The coating may be subsequently removed from the surface by simply washing with water when it is longer required. In a particularly preferred embodiment, the coatings of the present invention are used to protect components of automobiles or automobile surface finishes.

In one embodiment, the coatings of this invention include a dextrin, a plasticizer and water. Dextrin comprises from about 5 percent to about 60 percent, more preferably from about 20 percent to about 60 percent and most preferably from about 40 percent to about 50 percent, by weight, of the composition. A particularly preferred embodiment comprises about 30 to 40 percent, by weight, dextrin.

Dextrins are widely known as products of the hydrolysis of starch, often by amylases. More specifically, dextrins are polymers of D-glucose, characterized by an $\alpha(1\longrightarrow 4)$ linkage, which are intermediate in complexity between starch and maltose. The viscosity of dextrins, in aqueous solution, varies depending on dextrin length and degree of branching. However, compared with the original starch, dextrins produce aqueous solutions of lower viscosity. Commercially available dextrin typically comprises a mixture of higher viscosity and lower viscosity dextrins. As used herein, the term "dextrin" refers that combination of higher and lower viscosity dextrins as would be obtained in a typical commercial preparation such as Amaizo 1895, 1890, and 1885 (produced by American Maize Products Co.), Amiogum 35, and the like. Preferred dextrins have a viscosity ranging from about 12 to about 20 seconds, more preferably from about 12 to about 15 seconds, and most preferably about 12 seconds in an aqueous solution comprising 40 percent solids (dextrins), as measured using a number 3 Zahn cup. When measured as an aqueous solution comprising about 50 percent solids (dextrin) a most preferred dextrin has a viscosity ranging from about 95 to about 100 centipoise. One such preferred dextrin is an off-specification Amaizo 1895 designated Amaizo 2686N dextrin, available from American Maize Products, Co.).

While the "Amaizo" dextrins are derived from maize, dextrins derived from other sources are also suitable. These include native dextrins of any origin, synthetic, natural or hybrid, derived, for example from potatoes, manioc, corn, waxy corn, corn with high amylose content, wheat, rice, and the like.

Dextrin is utilized in the films of the present invention to provide solids and to build film thickness. It was an unexpected discovery of the present invention, that the use of dextrins provides masking compositions that show exceptional coating, film forming, and drying properties. In particular, the use of high concentrations of dextrins allow the buildup of a thick coating which nevertheless shows relatively low viscosity, good coating properties and an extremely rapid drying time. This is in dramatic contrast to starch-based compositions which typically cannot achieve comparable high solids concentration. Starches form highly viscous aqueous solutions that tend to gel at a solids concentration far too low to permit formation of a continuous protective film. Prior to the present invention, it was unknown and unsuspected that the use of dextrins would overcome this limitation and form the basis of an effective paint masking composition.

The quantity of dextrin in the coating composition may be optimized for a particular application. This is accomplished empirically. Generally where it is desired that the composition dry to provide a thicker final coating more solids (dextrin) are added to the composition. However, the upper limits to dextrin concentration are dictated by the resulting viscosity of the composition. The viscosity of the wet coating must be low enough to permit application to and continuous coating of the surface. Thus, in order to produce a thick coating one increases the solids concentration, but not beyond a point where the composition becomes difficult or impossible to apply. Conversely, where a thin coating is desired, the solids composition may be decreased, but not to a point where the composition fails to form a continuous protective coating when dried.

To some extent, the optimal solids content of the mixture is a function of the application method. It is expected that the composition may be applied by a variety of methods known to those of skill in the art. These methods include, but are not limited to painting, dipping, spraying, reverse roller coating, and the use of doctor bars. One of skill in the art will appreciate that application by spraying will generally require a composition of lower viscosity than application by the use of doctor bars. Thus a composition intended for application by spraying may contain a lower solids concentration than a composition applied by dipping or doctoring.

The coatings of the present invention also include a plasticizer to provide toughness and flexibility and in particular to prevent cracking of the film during drying and subsequent handling. Suitable plasticizers are well known to those of skill in the art and include, but are not limited to glycerine, urea, triethylene glycol, polyethylene glycol, and other water soluble plasticizers. These plasticizers may be used alone, or in combination with each other. A particularly preferred combination of plasticizers is urea in combination with glycerine or glycerine derivatives such as glycerine monostearate or glycerine monooleate.

Urea and glycerine are most preferred as plasticizers. When expressed as a percentage of the total coating compositions, the coatings utilizing urea as a plasticizer preferably include about 4 percent to about 12 percent urea, more preferably about 6 percent to about 12 percent urea and most preferably about 7 percent to about 12 percent urea, while the coatings utilizing glycerine as plasticizer preferably include about 0.8 percent to about 12 percent glycerine, more preferably about 4 to about 30 percent glycerine, and most preferably about 5 to about 30% glycerine.

When expressed as a percentage of dextrin, these ranges correspond to an amount ranging from about 10 percent to about 30 percent, more preferably from about 15 percent to about 30 percent, and most preferably from about 18 to about 30 percent by weight of the dextrin for urea. Similarly, for glycerine, these ranges correspond to an amount ranging from about 2 percent to about 30 percent, more preferably from about 4 percent to about 30 percent and most preferably from about 5 percent to about 30 percent, by weight, of the total masking composition.

In order to prevent cracking, the coatings of the present invention that are force dried typically require a higher plasticizer concentration than the coatings that are simply air dried. Thus, coatings that are simply air-dried may contain plasticizer in concentrations near the lower end of the ranges provided above. Thus, the air-dried coatings contain about 4 percent (10 percent, by weight, of the dextrin) urea or 0.8 percent (2 percent, by weight, of the dextrine) glycerine. Conversely, force dried coatings preferably contain higher concentrations of plasticizer. Thus, the force-dried coatings may contain about 7.2 percent (18 percent, by weight, of the dextrin) urea or about 2 percent (5 percent, by weight, of the dextrin) glycerine. Of course, coatings containing the higher amounts of plasticizer may be air dried as well. In addition, coatings containing the lower amount of plasticizer may often be successfully force-dried.

The coatings of the present invention may additionally contain a surfactant. In preferred embodiments, the masking composition includes nonionic alkyl aryl surfactants such as Triton CF-10 and CF-12 (Rohm & Haas, Philadelphia, Pa., U.S.A.). Also suitable is Triton X-100 and surfactants having fluorinated alkyl chains such as "Fluorad" products sold by Minnesota Mining and Manufacturing (St. Paul, Minn., U.S.A.) and "Zonyl" products sold by DuPont Company (Wilmington, Del., U.S.A.) are also suitable. In addition, many embodiments include polyethoxy adducts or modified (poly)ethoxylates such as Triton DF-12 and DF-16 sold by Union Carbide (Danbury, Conn., U.S.A.). Other surfactants include nonylphenoxypolyethanol (such as IGEPAL CO-660 made by GAF), polyoxyalkylene glycol (such as Macol 18 and 19 made by Mazer Chemicals), acetylenic diol-based surfactants (such as Surfynol 104A made by Air Products), and the like. Preferred compositions include up to 5 percent surfactant. More preferred compositions include less than 2 percent surfactant, and most preferred compositions include about 1 percent, or less, by weight, surfactant.

To provide a continuous and level film, the masking composition must adequately wet the surface to be protected. However, many surfaces, in particular, car body finishes, are themselves highly hydrophobic or purposely treated (e.g. waxed) to have a low surface free energy so that water will bead. To facilitate wetting and thereby prevent the masking composition from beading, the surface tension of the masking composition may be lowered by the addition of a surfactant.

A primary role of the surfactant in the masking composition is to wet the substrate thereby leading to the formation of a continuous film. A sufficiently continuous protective film could be obtained with little or no surfactant so long as the masking composition contains a very high solids content (e.g., high concentrations of dextrin). Films containing high solids concentrations are often highly viscous and therefore difficult to apply, especially by spraying. While, as explained above, the use of dextrins allows the production of coatings with a high solids content, the use of surfactants or other wetting agents is preferred as coatings containing surfactants show superior film-forming properties in a variety of application methods.

Coating compositions having good wetting properties may be prepared by adding certain surfactant compositions, by adding alcohols such as propanol, methanol, or isopropyl alcohol, or by adding aliphatic polyols such as water soluble alcohols up to octanol. However, many alcohols are not readily biodegradable and hence surfactants are preferably used with the masking compositions of the present invention.

Preferred surfactants for use in the masking compositions of the present invention should have certain beneficial properties. For example, they should reduce the surface tension of the composition to a sufficiently low value that a level film, free of pinholes, is laid down. In most instances the surfactant will reduce the surface tension of the masking composition to at most about 25 dynes per centimeter, and more preferably to at most about 20 dyne/cm. To avoid formation of pinholes, the surfactant should not foam. Further, the surfactant should work with a variety of surfaces such as those containing silicones, acrylic waxes, teflon® waxes, clear coats, natural and hydrocarbon waxes, etc. Still further preferred surfactants will be relatively inexpensive, will provide a product that does not spot, streak, or frame (i.e., evaporate faster at edges such as molding and/or trim) on the surface to be protected. Finally, the surfactant should be water soluble and otherwise compatible with the other components of the masking composition so that the composition does not separate and leave pinholes when dry.

Because many surfaces to be protected will have unusually low surface free energies, the surfactant should be able to dramatically lower the surface and interfacial tensions of the masking composition. Compositions having very low surface tensions also tend to produce many fewer pinholes in the coating. Thus, any of the known classes of very low surface tension surfactants are preferred for use with this invention. One such class is the alkoxylates of fluorinated alkyl chains. Other functional derivatives (e.g., esters, sulfonates, carboxylates, ammonium compounds, etc.) of fluorinated alkyl chains also tend to produce low surface tension aqueous solutions. In general, replacement of hydrogens on an alkyl group by fluorine atoms leads to surfactants of unusually low surface tension. The above mentioned "Fluorads" and "Zonyls" are examples of surfactants having fluorinated alkyl chains.

It has been discovered that a particularly preferred embodiment includes 2 percent of a 10 percent aqueous solution of CF-10 or Triton X-100 giving a final concentration of 0.2% surfactant. However, any combination of compatible surfactants that produce sufficient leveling on a given surface can be used. Particularly preferred compositions will provide a level film on a variety of different surfaces and will not spot, streak or frame when the film is rewetted.

The total surfactant in the material may include two or more different surfactants. In some embodiments, a "bulk" surfactant from a different chemical class will be admixed with a fluorinated surfactant to promote low interfacial tension and good rewetting properties. Preferred bulk surfactants will allow the mask to be rinsed off easily without spotting or streaking the underlying protected surface. Preferred bulk surfactants will produce very little or no foam during application or rinsing. They should also be relatively inexpensive. Suitable bulk surfactants include various compounds such as polyethoxylates and, in one case, octylphenoxypolyethoxyethanol. A particularly preferred bulk surfactant for use with Fluorad FC 171 and Fluorad FC 430 is Triton DF-16, a nonionic polyethoxylate or Turkey Red (Acrysol 75).

Another particularly preferred surfactant includes not over 2% total surfactant, but up to about 0.02%, more preferably about 0.01% to about 0.02% and most preferably about 0.01% to 0.02% of one or more fluorinated surfactants. One such surfactant comprises about 0.06% Fluorad FC 171, about 0.04% Fluorad FC 430 and about 1.0% Triton DF-16 or Turkey Red (Acrysol 75).

In another preferred embodiment, the masking compositions of the present invention may include an aliphatic polyol such as polyvinyl alcohol in addition to the dextrin. When present a polyvinyl alcohol comprises from about 2 percent to about 15 percent, more preferably from about 5 percent to about 12 percent and most preferably about 10 percent, by weight, of the masking composition. One particularly preferred aliphatic polyol is DuPont Corporation's Elvanol 5105 having a molecular weight of about 15,000 to about 27,000 daltons. The aliphatic polyol component may include two different polyols having different molecular weight ranges. For example, DuPont Corporation's Elvanol 5105 (15,000 to 27,000 daltons) and Elvanol 5042 (70,000 to 100,000 daltons) can be used together in some formulations.

It has been found that for general purposes, a superior masking material includes dextrin, a plasticizer, a surfactant and water. According to preferred embodiments, the composition includes about 30 to about 40 percent dextrin, about 50 to about 10 percent plasticizer and not over 2 percent total surfactant. The surfactant may comprise up to about 0.02 weight percent fluorinated surfactant. Thus, one particularly preferred embodiment includes about 33 percent dextrin, about 7 percent plasticizer, and about 1.01 percent surfactant comprising about 0.01 percent fluorinated surfactant. The plasticizer may be urea or urea in combination with glycerine or a glycerine derivative such as glycerine monostearate or glycerine monooleate.

In another preferred embodiment the coating composition may include about 40% dextrin and about 0.2 percent surfactant (e.g. Triton CF-10 or Triton X-100 by Rohm and Haas), plasticizer, and the remainder water. Thus one particularly preferred embodiment includes about 40 percent dextrin, 8 percent urea, 2 percent of a 10 percent (w/v) aqueous solution of surfactant (e.g. Triton CF-10), and 50% water. In another preferred embodiment, the 8 percent urea or the preceding embodiment is substituted with a combination of urea and glycerine comprising about 2 percent (of the total composition) glycerine and 5 percent (of the total composition) urea. In yet another embodiment, the 8 percent of urea may be replaced with about 2 percent glycerine and the water may be increased to about 56 percent of the total composition. Yet another embodiment, particularly suitable for force drying, includes about 40 percent dextrin, about 20 percent urea, about 2 percent of a 10 percent (w/v) solution of surfactant (e.g. Triton X-100), and about 38 percent water.

Finally, one preferred embodiment, including an aliphatic polyol includes about 20 percent dextrin, about 10 percent polyvinyl alcohol (e.g. Elvanol 5105), about 3 percent glycerine, about 2 percent of a 10 percent (w/v) of a surfactant (e.g. Triton CF-10) and about 65 percent, by weight, water.

The mask composition is an aqueous solution and therefore includes a substantial amount of water before drying. A variety of other materials may also be included in the coatings to confer specific additional properties. Thus, for example, the coating compositions may additionally include dyes or colorants, antioxidants or corrosion inhibitors, ultraviolet inhibitors, flash rust inhibitors and the like. Preferred embodiments may include foam reduction or foam control agents such as FoamMaker™, Bubble Breaker™, and 1 and 2 octanol. Antistatic compounds (preferably water soluble antistatics such as Larostat 264A made by Mazer Chemicals) may be added in preferred embodiments prevent dust from being drawn to the surface. Preferred embodiments may also include sequesterants (typically less than 1%).

Preferred embodiments may also include components to adjust pH. Means of adjusting pH are well known to those of skill in the art. In particular, where the composition is to be used as a masking composition on an automotive finish, it is often desirable to adjust the composition to a basic pH of about 9. This may be accomplished by the addition of one of a number of water soluble bases well known to those of skill in the art. These include, but are not limited to sodium hydroxide, sodium bicarbonate and amine bases such as pyridine and ethylamine and ammonia.

The coating solutions are made by conventional means which typically comprise mixing the components of the masking material at substantially atmospheric pressure, so as to form a homogeneous solution. Heat may be applied to speed preparation of the coating solution. After formation of a homogeneous solution, the pH may be adjusted as discussed above. In a particularly preferred embodiment, the pH is adjusted to pH 9 by the addition of ammonia.

The masking material is applied by one of a variety of techniques known to those of skill in the art. These include painting, dipping, spraying, reverse roller coating, and the use of doctor bars. Particularly preferred techniques include brushing and spraying of the material. In one preferred embodiment the surface to be protected is blown dry of dust and debris. In some cases, additional water may be added for easier application, such as a 10% dilution. Thereafter, the masking material is applied with a pressure pot sprayer, preferably first in a thin mist and, thereafter, in a flow coat or thicker substantially continuous film. For some applications, the mist coat will not be necessary. The mask material is sprayed primarily on the surface to be protected, although overspray will not pose significant problems since any overspray may be readily removed with, for example, a wet towel or sponge.

In preferred embodiments, the resulting masking coating is applied in a wet coating in a thickness ranging from about 1 to about 10 mils, more preferably ranging from about 1 to about 4 mils, and most preferably ranging from about 1 to about 2 mils. This wet coating then dries to form a continuous dry coating ranging from about 0.5 to about 5, more preferably from about 0.5 to about 2 and most preferably from about 0.5 to about 1 mil in thickness.

The masking material is typically permitted to dry at atmospheric temperatures and pressures. For a 1 to 2 mil wet thickness coating, such drying will take about 10 minutes at 70° F. and about 50% humidity.

Alternatively, the masking composition may be force-dried. Force drying may be accomplished by means well known to those of skill in the art. These include, but are not limited to the application of heat (e.g. radiant heating, oven baking, or hot air blowers), the reduction of air humidity, air movement or any combination of these means. Under forced drying conditions at about 150° F. and about 50% humidity, the same coatings will dry in about 2 minutes.

After drying of the masking composition, the remaining unprotected surface is then painted or otherwise coated without fear of overspray on the portions of the surface protected by the masking material. If the processing operation includes painting, the paint applied to the surface and allowed to thoroughly dry. Such drying times will vary radically depending upon the particular type of paint utilized.

After drying of the paint, the masking material is removed from the protected surface. Such removal operations may include, for example, peeling or scraping of the material off of the protected surface. However, it is most preferred that the masking composition be removed by normal washing with water. Pressure washing with water may be desired in some instances. The material will be removed readily since it is easily miscible or soluble in water.

One of skill in the art will readily appreciate that the steps of applying and drying the masking composition, applying and drying the paint or other subsequent coating, and removing the masking coating may be easily set up for mass production, as in an assembly line.

EXAMPLES

The following examples are intended to illustrate the present invention and are not intended to limit the scope of the invention in any way.

Example 1

To produce the various surface protective coatings, designated coating 1 through coating 4, dextrin, a plasticizer, a surfactant and water were combined in the amounts shown in Table 1. The components were combined at room temperature and at atmospheric pressure by slow stirring to form the various surface protective coating compositions shown in Table 1. The homogeneous coating compositions were then adjusted to pH 9 by the addition of ammonia.

TABLE 1

Composition of four dextrin-based masking compositions.

| Ingredient | Weight Percent* | | | |
| --- | --- | --- | --- | --- |
|  | Coating 1 | Coating 2 | Coating 3 | Coating 4 |
| Dextrin Amizo 1895 | 40 | 40 | 40 | 40 |
| Urea Adrich 208884 | 8 | — | 6 | 20 |
| Glycerine 96% USP grade, Dow Chemical | — | 2 | 2 | — |
| Triton CF-10 | 0.2 | 0.2 | 0.2 | — |
| Triton X-100 | — | — | — | 0.2 |
| Deionized Water | 51.8 | 57.8 | 51.8 | 39.8 |

*Weight percent refers to weight percent of the total composition accounted for by the active ingredient.

The coatings were each applied, by spraying, to an automotive body panel test surface thereby masking a portion of the test surface. The coatings were then either air dried or force-dried by heating.

The masked test panel was then sprayed with an automotive body paint and allowed to dry. The coating compositions were then removed from the masked portion of the panel by simply washing the panel with water.

The coatings generally provided uniform wetting of the test surface. They dried rapidly, typically a 1 mil layer drying in about 21 minutes at ambient temperature (approximately 60° F. and 50% humidity).

The coatings were easily removed by the application of pressurized water and the masked regions showed little or no penetration by the paint.

Example 2

The components illustrated in Table 2 are combined, in the amounts shown, at room temperature and at atmospheric pressure by slow stirring to form a surface protective coating composition. Again, ammonia is added to adjust the pH to pH 9.

TABLE 2

Composition of a dextrin/polyvinyl alcohol based masking composition.

| Ingredient | Weight Percent* |
| --- | --- |
| Dextrin Amaizo 5985 | 20 |
| Elvanol 5105 | 10 |
| Glycerin | 3 |
| Triton CF-10 | 0.2 |
| Deionized Water | 66.8 |

*Weight percent refers to weight percent of the total composition accounted for by the active ingredient.

The composition is applied to a test panel and allowed to dry as described in Example 1. The test panel is then painted and allowed to dry. The masking composition is then washed off of the panel using water to reveal the masked surface.

Example 3

Coatings were also prepared using a low viscosity dextrin having a viscosity ranging from about 95 to about 100 centipoise in an aqueous solution comprising about 50% solids. The coating were prepared containing the percentages of dextrin, plasticizer and surfactants as shown in Table 3. Once a homogeneous solution was obtained, the pH was adjusted to 9 by the addition of ammonia.

TABLE 3

Composition of various low viscosity dextrin compositions.

| Ingredient | Coating 1 | Coating 2 | Coating 3 | Coating 4 |
|---|---|---|---|---|
| Low Viscosity Dextrin Amaizo 2686N | 33 | 33 | 33 | 33 |
| Urea Aldrich 208884 | 7 | 7 | 5.6–5.95 | 5.6–5.95 |
| Glycerine monosterate or glycerine monoleate | — | — | 1.05–1.4 | 1.05–1.4 |
| DF16 | 1 | — | — | — |
| Turkey Red Acrysol 75 | — | 1 | 1 | 1 |
| FC171 3M | 0.06 | 0.06 | 0.06 | 0.06 |
| FC430 3M | 0.04 | 0.04 | 0.04 | 0.04 |
| Turkey Red Acrysol 75 | — | 1 | 1 | 1 |
| Deionized Water | 58.9 | 58.9 | 58.9 | 58.9 |

*Weight percent refers to weight percent of the total composition accounted for by the active ingredient.

The coatings were applied to test panels by spraying. The coatings generally provided uniform wetting of the test surface. They dried rapidly, typically a 1 mil layer drying in about 21 minutes at ambient temperature (approximately 60° F. and 50% humidity).

The coatings were easily removed by the application of pressurized water and the masked regions showed little or no penetration by the paint.

Example 4

To compare a dextrin-based coating of the present invention with the commercially available polyvinyl alcohol coating SlimePlus™, each half of a test panel bearing an automotive acrylic finish, was respectively coated with SlimePlus™ or with a dextrin coating comprising the components illustrated in Table 3.

TABLE 4

Test composition for comparison with SlimePlus ™.

| Ingredient | Weight Percent* |
|---|---|
| Dextrin Amaizo 1895 | 33% |
| Urea Aldrich 208884 | 7% |
| DF-16 surfactant Union Carbide | 1% |
| FC-171 3M | 0.06% |
| FC-430 3M | 0.04% |
| Deionized Water | 58.9% |

*Weight percent refers to weight percent of the total composition accounted for by the active ingredient.
**After the components listed above were combined to form a heterogeneous solution, the pH was adjusted to pH 9 by the addition of ammonia.

The two sides of the panel were simultaneously coated; one with the SlimePlus™ composition and the other with the dextrin composition. The wet coatings were applied in a thickness sufficient to provide a uniform continuous dry film about 1 mil thick. This required about a 3–4 mils wet coating of SlimePlus™, while only a 1 mil wet coating of the dextrin compound.

Under ambient conditions (about 62° F. and 60% humidity), the dextrin composition dried in about 21 minutes, while the SlimePlus™ coating took well over an hour to dry. Both coatings provided a continuous substantially free of pinholes and dry to the touch.

The dextrin based coating, however, eliminated a whitening of black paint observed with SlimePlus™. Without being bound to a particular theory, it is believed that SlimePlus™ passes through a gel phase when drying. This gel phase tends to hydrate the automotive paint coating on the underlying surface producing a temporary local whitening. The dextrin coatings of the present invention eliminate paint hydration and the resulting whitening thereby requiring less post rinse-off cleaning of the underlying (protected) surface.

The above description is illustrative and not restrictive. Many variations of the invention will become apparent to those of skill in the art upon review of this disclosure. Merely by way of example, while the invention is illustrated with regard to particular brands of materials used in the mask, the invention is not so limited. The scope of the invention should, therefore, be determined not with reference to the above description, but instead should be determined with reference to the appended claims along with their full scope of equivalents.

What is claimed is:

1. A method of temporarily protecting a surface of a vehicle, said method comprising:
   a) applying a masking material to said surface of a vehicle, said step of applying resulting in a substantially continuous film of said masking material, said masking material comprising an aqueous solution of:
      i) a dextrin present in an amount ranging from about 20 to about 60 weight percent of said masking material; and
      ii) a plasticizer present in an amount sufficient to prevent cracking of said film when said masking material is dried;
   b) coating a portion of said surface of a vehicle with a coating compound, said masking material preventing said coating compound from contacting said surface; and
   c) removing said masking material from said surface of a vehicle by washing;
   said removing step being performed after said coating step.

2. The method of claim 1, wherein said masking material further comprises a surfactant.

3. The method of claim 2, wherein said masking composition further comprises a polyvinyl alcohol.

4. The method of claim 3, wherein said masking composition comprises:
   about 20 weight percent dextrin;
   about 10 weight percent polyvinyl alcohol;
   about 3 weight percent glycerine; and
   about 0.2 weight percent surfactant.

5. The method of claim 1, wherein said applying comprises contacting said surface with said masking material and force-drying said masking material to form a substantially continuous film.

6. The method of claim 1, wherein said plasticizer is present in an amount ranging from about 0.8 to about 12 weight percent of said masking material.

7. The method of claim 1, wherein said vehicle is an automobile.

8. A method of temporarily protecting a surface of a vehicle, said method comprising:
   a) applying a masking material to said surface of a vehicle, said step of applying resulting in a substantially continuous film of said masking material, and said masking material comprising an aqueous solution of:
      about 30 to about 40 weight percent dextrin;
      about 5 to about 10 weight percent plasticizer; and
      up to about 0.2 weight percent fluorinated surfactant;
   b) coating a portion of said surface of a vehicle with a coating compound, said masking material preventing said coating compound from contacting said surface; and
   c) removing said masking material from said surface of a vehicle by washing; said removing step being performed after said coating step.

9. The method of claim 8, wherein said masking material comprises:
   about 33 weight percent dextrin;
   about 7 weight percent plasticizer; and
   about 1.01 weight percent surfactant comprising about 0.01 weight percent fluorinated surfactant.

10. The method of claim 9, wherein said plasticizer is urea.

11. The method of claim 9, wherein said plasticizer comprises urea and a plasticizer selected from the group comprising glycerine, glycerine monostearate, and glycerine monooleate.

12. The method of claim 8, wherein said masking material comprises:
   about 40 weight percent dextrin;
   about 8 weight percent urea; and
   about 0.2 weight percent surfactant.

13. The method of claim 8, wherein said masking material comprises:
   about 40 weight percent dextrin;
   about 2 weight percent glycerine; and
   about 0.2 weight percent surfactant.

14. The method of claim 8, wherein said masking material comprises:
   about 40 weight percent dextrin;
   about 6 weight percent urea;
   about 2 weight percent glycerine; and
   about 0.2 weight percent surfactant.

15. The method of claim 8, wherein said masking composition comprises:
   about 40 weight percent dextrin;
   about 20 weight percent urea; and
   about 0.2 weight percent surfactant.

16. A temporary surface protective composition comprising an aqueous solution of:
   a dextrin present in an amount ranging from about 20 to about 60 weight percent of said masking material; and
   plasticizer present in an amount ranging from about 0.8 to about 12 weight percent of said masking material; and
   a surfactant.

17. The composition of claim 16, wherein said masking material comprises
   about 33 weight percent dextrin;
   about 7 weight percent plasticizer; and
   about 1.01 weight percent surfactant comprising about 0.01 weight percent fluorinated surfactant.

18. The composition of claim 17, wherein said plasticizer is urea.

19. The composition of claim 17, wherein said plasticizer is glycerine.

20. The composition of claim 17, wherein said plasticizer comprises urea and a plasticizer selected from the group consisting of glycerine, glycerine monostearate, and glycerine monooleate.

* * * * *